(12) United States Patent
Erickson et al.

(10) Patent No.: US 12,732,358 B2
(45) Date of Patent: Sep. 8, 2026

(54) SECURE KEY EXCHANGE IN A MULTI-PROCESSOR DEVICE

(71) Applicant: Rambus Inc., San Jose, CA (US)

(72) Inventors: Evan Lawrence Erickson, Chapel Hill, NC (US); Joel Wittenauer, Pleasanton, CA (US); Winthrop John Wu, Pleasanton, CA (US)

(73) Assignee: Rambus Inc., San Jose, CA (US)

( * ) Notice: Subject to any disclaimer, the term of this patent is extended or adjusted under 35 U.S.C. 154(b) by 194 days.

(21) Appl. No.: 17/990,417

(22) Filed: Nov. 18, 2022

(65) Prior Publication Data

US 2023/0163964 A1 May 25, 2023

Related U.S. Application Data

(60) Provisional application No. 63/282,612, filed on Nov. 23, 2021.

(51) Int. Cl.
*H04L 29/00* (2006.01)
*H04L 9/08* (2006.01)

(52) U.S. Cl.
CPC .......... *H04L 9/0877* (2013.01); *H04L 9/0816* (2013.01)

(58) Field of Classification Search
CPC ............................ H04L 9/0877; H04L 9/0816
USPC .......................................................... 713/189
See application file for complete search history.

(56) References Cited

U.S. PATENT DOCUMENTS 7,644,266 B2 1/2010 Ahuja et al.
8,332,653 B2 * 12/2012 Buer ..................... G06F 21/575 713/193
8,458,483 B1 6/2013 Bailey et al.
9,628,445 B2 4/2017 Antonakakis
2001/0056540 A1 * 12/2001 Ober ....................... G06F 21/79 713/193
2016/0366114 A1 * 12/2016 Iizuka ................. H04L 63/0471
2019/0340136 A1 * 11/2019 Irwin .................... G06F 3/0608

* cited by examiner

*Primary Examiner* — Jeffrey C Pwu
*Assistant Examiner* — Michael D Anderson
(74) *Attorney, Agent, or Firm* — Lowenstein Sandler LP

(57) ABSTRACT

An integrated circuit comprises an interface controller to receive a message, wherein at least a portion of the message is encrypted, a primary processor coupled to the interface controller and configured to process the received message, and a secondary secure processor coupled to the primary processor and to the interface controller. The secondary secure processor is configured to decrypt the portion of the message that is encrypted on behalf of the primary processor, analyze the decrypted portion of the message to determine whether the decrypted portion comprises information pertaining to sensitive data, and responsive to determining that the decrypted portion comprises information pertaining to sensitive data, process the information pertaining to the sensitive data and provide the sensitive data to the interface controller via a secure private bus not accessible by the primary processor.

20 Claims, 4 Drawing Sheets

SECURE KEY EXCHANGE IN A MULTI-PROCESSOR DEVICE

RELATED APPLICATIONS

This application claims the benefit of U.S. Provisional Patent Application No. 63/282,612, filed Nov. 23, 2021, the entire contents of which are hereby incorporated by reference herein.

BRIEF DESCRIPTION OF THE DRAWINGS

The present disclosure is illustrated by way of example, and not by way of limitation, in the figures of the accompanying drawings.

DETAILED DESCRIPTION

Figure 1:
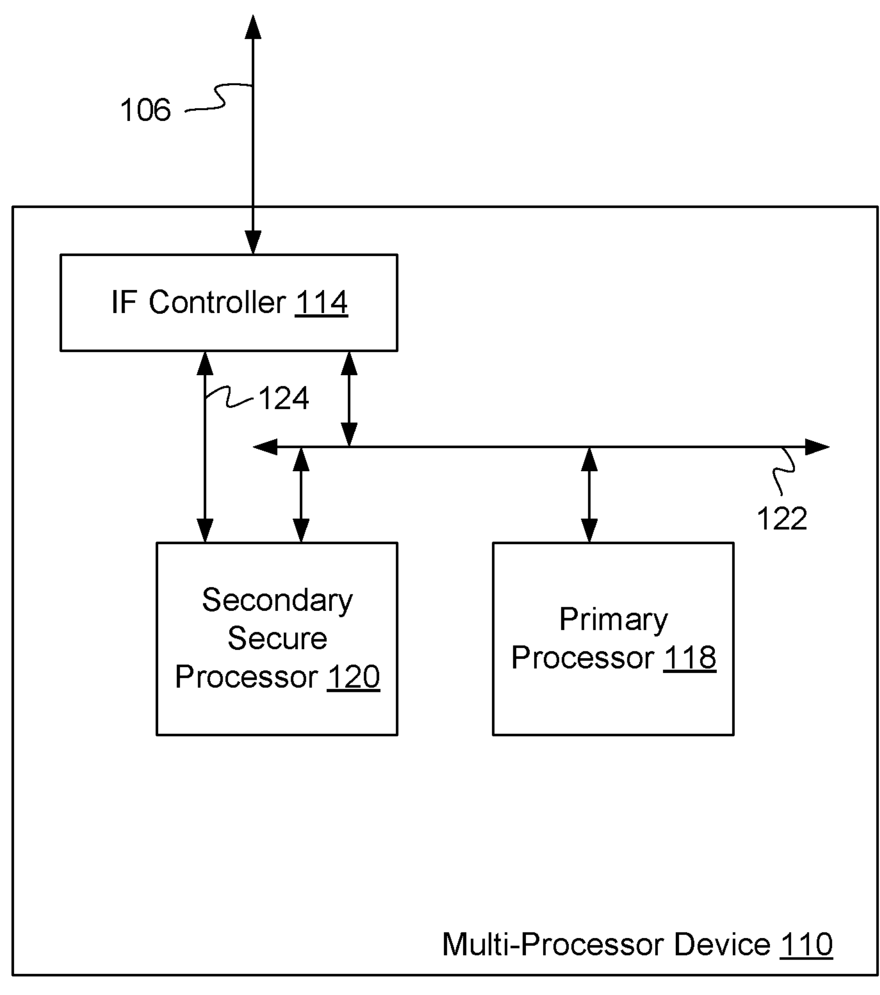
FIG. 1 is a block diagram illustrating a multi-processor device implementing secure key exchange, according to an embodiment.

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Aspects of the present disclosure include a secure key exchange protocol for use in multi-processor devices. Certain communication standards define protocols for interconnecting processing devices (e.g., the central processing unit of a host system) and memory (e.g., a memory module including control logic and one or more memory devices) in a cache coherent manner, such that shared data stored in multiple cache locations remains consistent. One example of such a standard is the Compute Express Link (CXL) standard. Certain versions of CXL, for example, or other similar protocols utilize various forms of authentication and key management to ensure the integrity of the data being transferred. For example, CXL utilizes the Security Protocol and Data Module (SPDM) protocol and a Diffie-Hellman key exchange to create a secured (i.e., encrypted) SPDM session over a CXL link. Symmetric keys for Integrity and Data Encryption (IDE) can be exchanged using the secured SPDM session using vendor-defined SPDM messages for encrypting the CXL traffic. Depending on the implementation, secured SPDM messages can be transferred via an in-band data channel on the CXL link encapsulated using Management Component Transport Protocol (MCTP), via an in-band channel on the CXL link via a Data Object Exchange (DOE) interface, or via an out-of-band external interface encapsulated using MCTP.

In one implementation, the secured SPDM messages associated with exchange of IDE keys can be communicated between a requestor (e.g., a host system) and a memory (e.g., a memory module). There can be, for example, a buffer device that receives the messages located within the memory module or between the memory module and the host system. In one embodiment, the buffer device is a multi-processor integrated circuit including a primary processor and a secondary secure processor. The primary processor can manage the communication interface(s) used to exchange messages with the host system (e.g., a CXL interface and/or a separate external interface) and can process most commands received at the buffer device. The secondary secure processor can perform certain cryptographic functions on behalf of the primary processor, such as secure boot and firmware updates, processing of cryptographically signed commands, as well as encryption/decryption, measurement, and key management services. In one embodiment, the secondary secure processor is a hardware root-of-trust processor that is specifically built for key management and cryptographic operations. That is, the secondary secure processor can have a different architecture than a general processor, such as the primary processor, that provides certain security enhancements. With the secondary secure processor handling cryptographic functions on behalf of the primary processor, the encryption keys, such as IDE keys, remain secured as they are never accessible to the primary processor in a cleartext format and, thus are not vulnerable to security breaches. Additional details with respect to the secure key exchange protocol in multi-processor devices are provided below with respect to FIGS. 1-4.

FIG. 1 is a block diagram illustrating a multi-processor device implementing secure key exchange, according to an embodiment. As illustrated, multi-processor device 110 includes interface circuitry, such as interface controller 114, to receive messages from a requestor over a communications link 106. Multi-processor device 110 further includes a primary processor 118 coupled to the interface controller 114 to process requests in the received messages, and a secondary secure processor 120 coupled to the interface controller 114 to perform cryptographic functions on behalf of the primary processor 118. The interface controller 114, the primary processor 118 and the secondary secure processor 120 can be coupled together via a bus 122. In one embodiment, the primary processor 118 is responsible for overall control of the multi-processor device 110, while the secondary secure processor 120 operates on behalf of the primary processor 118. In one embodiment, the secondary secure processor 120 takes the form of a secure processor, such as a hardware root of trust (RoT), to carry out cryptographic operations on behalf of the primary processor 118. Acting on behalf of the primary processor 118, the secondary secure processor 120 can decrypt incoming requests, encrypt outgoing responses from the primary processor 118, perform attestation operations and other cryptographically-related tasks as the need arises. In some embodiments, the secondary secure processor 120 is responsible for a secure boot process for the multi-processor device 110.

In one embodiment, the primary processor 118 and the secondary secure processor 120 take the form of processor cores disposed on a single integrated circuit (IC) die, or chip, forming a system-on-chip (SoC). In such an embodiment, the bus 122 may form one or more of an advanced extensible interface (AXI) for high-speed communications on-chip between the primary processor 118 and the secondary secure processor 120, and/or an advanced peripheral bus (APB) for low-speed control signals transferred on-chip between the processors. Other embodiments may employ separate processor chips disposed on a common substrate to form a chiplet, multi-chip module (MCM) or system-in-package (SIP). Yet other embodiments may employ an interconnected system of multiple packaged processors disposed on separate substrates.

The primary processor 118 generally controls all transfers of requests, data and/or messages dispatched between the multi-processor device 110 and the requestor (e.g., a host system) via communications link 106. The requests may take the form of commands and/or interrupts alerting the processor to actions that are to be taken. For one embodiment, the communications link 106 at least partially takes the form of a serial management bus (SMBus), inter-integrated circuit (I2C), improved inter-integrated circuit (I3C), or similar chip communications link. In certain embodiments, as explained below, the communications link 106 may also include a high-bandwidth Compute Express Link (CXL) interface.

In one embodiment, a message is received from a requestor by the interface controller 114 over communications link 106. In one embodiment, at least a portion of the message is encrypted, such as included in a secured SPDM message and/or using MCTP encapsulation. The primary processor 118 can extract the encrypted portion of the message if necessary, and provide a request to the secondary secure processor 120 (e.g., using an internal application programming interface (API) call) to decrypt the encrypted portion of the message. In response to the request, the secondary secure processor 120 can decrypt the portion of the message that is encrypted on behalf of the primary processor 118 (e.g., using an SPDM session key) and analyze the decrypted portion of the message to determine whether the decrypted portion comprises information pertaining to sensitive data. In one embodiment, the secondary secure processor 120 can check to see if the decoded portion is a vendor defined message, and if so, examine a header in the decoded portion to see if the portion includes a specific type of command. If the specific type of command pertaining to sensitive data is not present, the secondary secure processor 120 can return the decoded portion of the message to the primary processor 118 for further processing.

If, however, the specific type of command pertaining to sensitive data is present, the secondary secure processor 120 can process the command and provide the sensitive data (e.g., symmetric IDE keys) to the interface controller 114 via a secure private bus 124. The secure private bus 124 is separate from bus 122 and is not accessible by the primary processor 118. This ensures that the sensitive data is not read by the primary processor 118 and remains secure.

Figure 2:
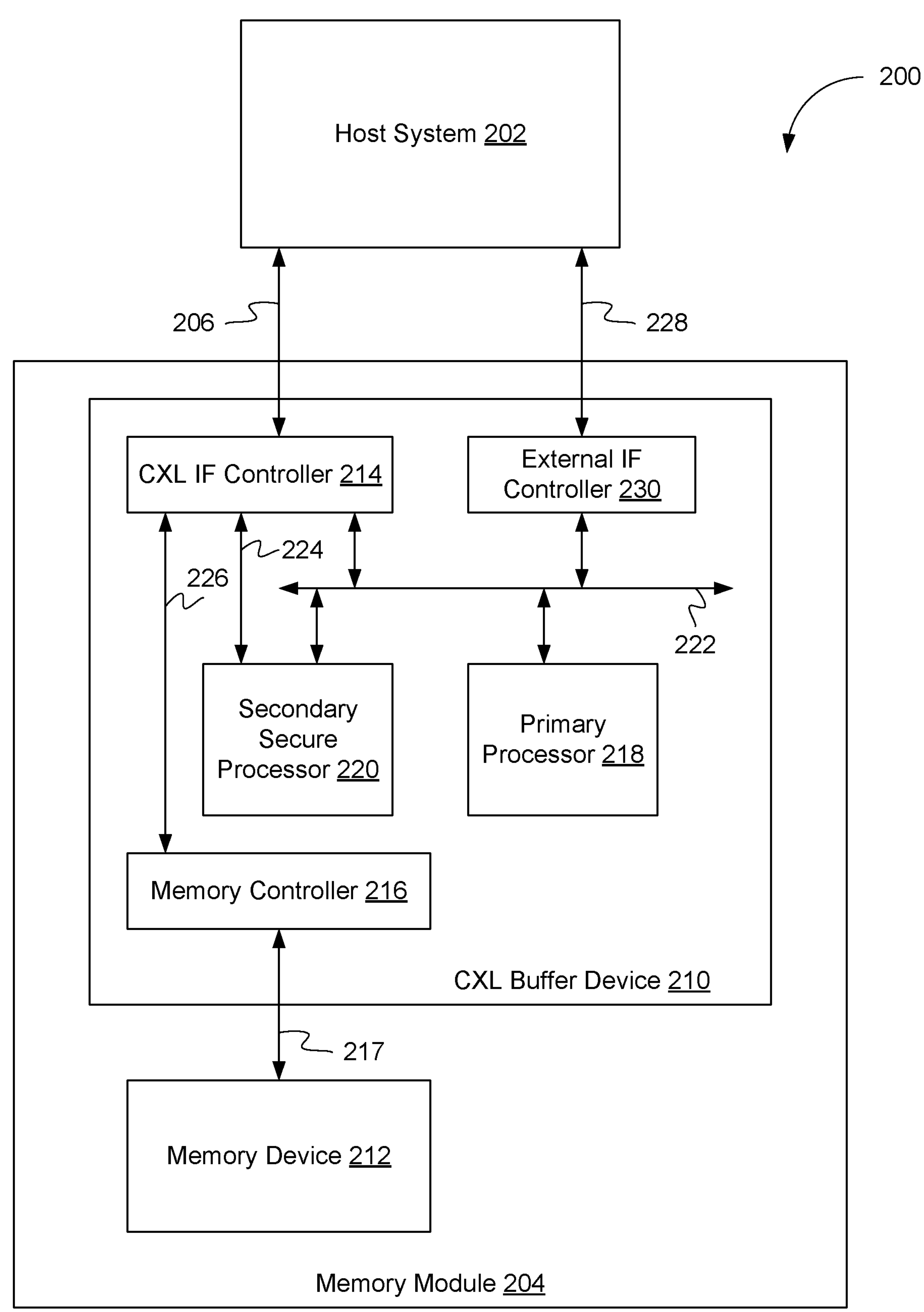
FIG. 2 is a block diagram illustrating a memory system including a multi-processor device implementing secure key exchange, according to an embodiment.

FIG. 2 is a block diagram illustrating a memory system including a multi-processor device implementing secure key exchange, according to an embodiment. The memory system 200 includes a host system 202 coupled to a memory module 204 employing a CXL Type 3 memory device in the form of a CXL buffer device 210. The host system 202 can interface with the memory module 204 primarily through a CXL link 206. For example, the host system 202 can communicate with the memory module 204 via CXL link 206 utilizing protocols consistent with the CXL standards, such as CXL.io and CXL.mem. For some embodiments that involve CXL Type 2 devices, an additional CXL.cache protocol may also be utilized.

The memory module 204 is configured to generally support the distributed CXL memory architecture, thus allowing one or more hosts to access one or more memory devices, such as memory device 212 (e.g., a Dynamic Random Access Memory (DRAM) device or a non-volatile memory device), via the CXL buffer device 210. In one embodiment, the CXL buffer device 210 takes the form of a system-on-chip (SOC) and includes any of the features described above with respect to the multi-processor device 110 of FIG. 1.

Referring again to FIG. 2, in one embodiment, the CXL buffer device 210 employs a primary interface that includes an in-band CXL interface controller 214 and a memory controller 216. The in-band CXL interface controller 214 and the memory controller 216 cooperate to provide a transfer path between the in-band CXL link 206 and the memory device 212. In one embodiment, the CXL interface controller 214 and the memory controller 216 are directly coupled via bus 226. In one embodiment, the memory controller 216 includes a double data rate (DDR) memory controller to manage the DRAM memory device 212 via a secondary interface 217. A primary processor 218 within the CXL buffer device 210 is configured to solely control the memory controller 216 during normal operation. In accordance with CXL standards, the primary processor 218 controls the in-band CXL interface controller 214, yet is prevented from directly accessing the memory device 212 in most circumstances to enhance security.

Acting on behalf of the primary processor 218, a secondary secure processor 220 within the CXL buffer device 210 is coupled to the primary processor 218 via an internal system bus 222. As explained above with respect to the multi-processor device 100 of FIG. 1, the secondary secure processor 220 may take the form of a hardware root of trust (RoT) to carry out cryptographic operations on behalf of the primary processor 218. For one CXL-related embodiment, the secondary secure processor 220 is responsible for encryption/decryption in hardware, as necessary, and may include storage to store cryptographic keys securely. The secondary secure processor 220 can also participate in device attestation operations, confirming that a given device is what it says it is, through certificate verification and or other identity confirmation techniques. For some embodiments, the secondary secure processor 220 may exclusively control the secure boot flow for the CXL buffer device 210.

In one embodiment, communications between the host system 202 and the memory module 204 are enhanced through the use of a side-band channel or link 228 that is independent of the CXL link 206. To support use of the side-band channel, the CXL buffer device 210 employs additional external interface circuitry in the form of a side-band external interface controller 230, which may support link protocols such as SMBus, I2C and/or I3C. Use of the side-band link 228 provides an auxiliary channel for the CXL buffer device 210 to communicate with the host system 202 in the event of a failure event associated with the CXL link 206 or to otherwise preserve the bandwidth of the CXL link 206. For example, the host system 202 may communicate with the CXL buffer device 210 without interfering with CXL-related signal transfers on CXL link 206. In one embodiment, the side-band link 228 can coupled the memory module 204 to some other device besides host system 202, such as a management server. In such an embodiment, CXL link 206 and side-band link 228 can each couple memory module 204 to different devices.

In one embodiment, a message is received at memory module 204 from host system 202. Depending on the embodiment, the message can be received at CXL interface controller 214 over CXL link 206, or at external interface controller 230 over side-band link 228. In either embodiment, at least a portion of the message can be encrypted, such as included in a secured SPDM message and/or using MCTP encapsulation. The primary processor 218 can extract the encrypted portion of the message if necessary, and provide a request to the secondary secure processor 220 (e.g., using an internal API call) to decrypt the encrypted portion of the message. In response to the request, the secondary secure processor 220 can decrypt the portion of the message that is encrypted on behalf of the primary processor 218 (e.g., using an SPDM session key) and analyze the decrypted portion of the message to determine whether the decrypted portion comprises information pertaining to a link encryption key (e.g., an IDE key) associated with data transfer between host system 202 and memory module 204 over CXL link 206. In one embodiment, the secondary secure processor 220 can check to see if the decoded portion is a vendor defined message, and if so, examine a header in the decoded portion to see if the portion includes a specific type of command (e.g., an encryption key program request or an encryption key creation request). If the specific type of command pertaining to a link encryption key is not present, the secondary secure processor 220 can return the decoded portion of the message to the primary processor 218 for further processing.

If, however, the specific type of command pertaining to a link encryption key is present, the secondary secure processor 220 can process the command (e.g., by extracting the link encryption key from the message or creating a link encryption key) and provide the link encryption key to the CXL interface controller 214 via a secure private bus 224. The secure private bus 224 is separate from bus 222 and is not accessible by the primary processor 218. This ensures that the sensitive data is not read by the primary processor 218 and remains secure. CXL interface controller 214 can subsequently utilize the link encryption key to securely transfer data (e.g., read data or write data) between memory module 204 and host system 202 over CXL link 206.

The memory system 200 of FIG. 2 operates generally to allow for accesses to the memory device 212 by the host system 202 in a secure manner. Central to the system operation is the CXL buffer device 210 operation, since it has overall control of all memory device accesses and the responsibility of securing all memory transactions. As a more specific form of the multi-processor device 100, the CXL buffer device 210 generally operates in much the same way as described above with slight variations to account for specific CXL protocols and associated circuitry. Additional details with respect to the operation of CXL buffer device 210 are provided below.

Figure 3:
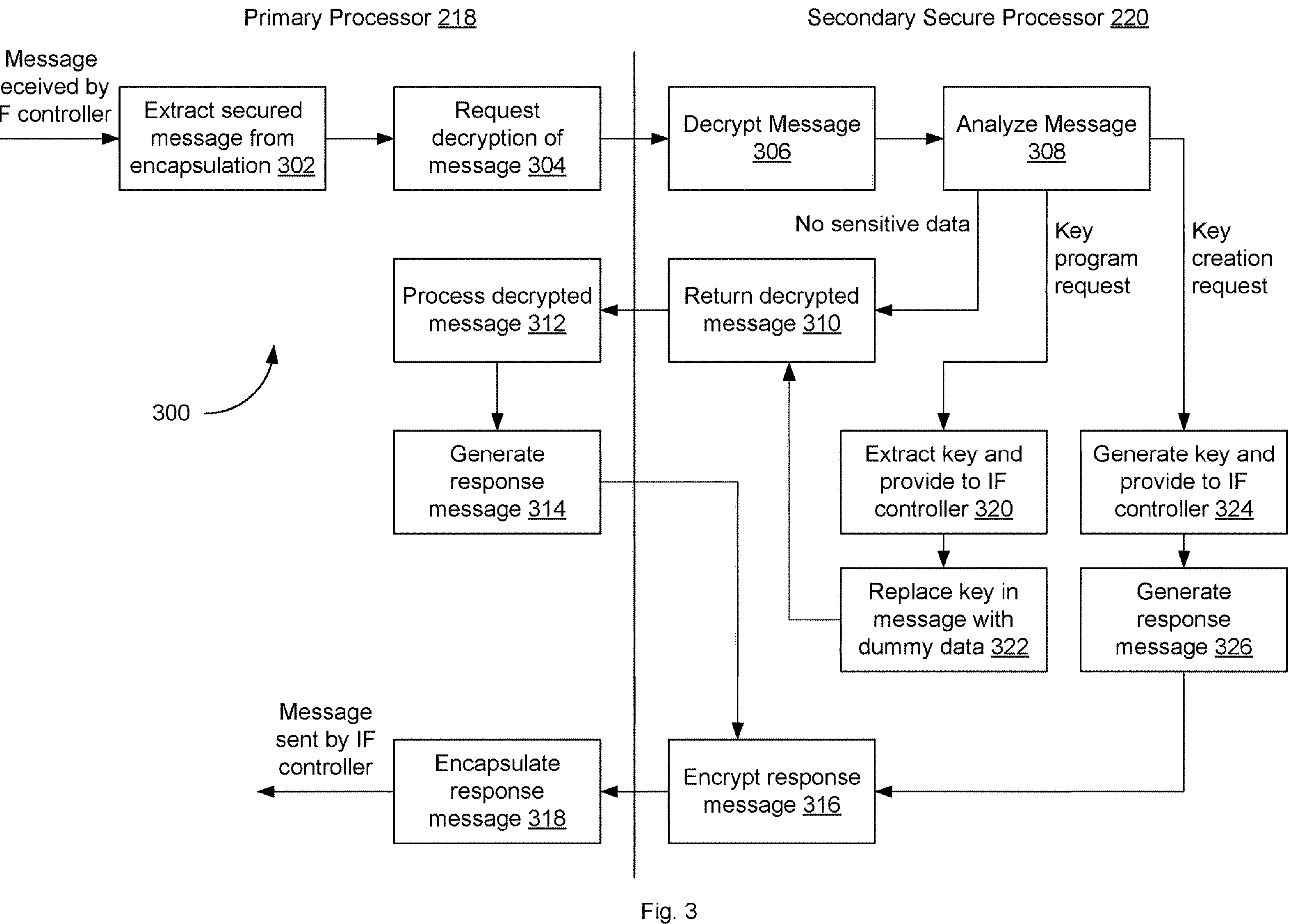
FIG. 3 is a flow diagram illustrating a method for secure key exchange in a multi-processor device, according to an embodiment.

FIG. 3 is a flow diagram illustrating a method for secure key exchange in a multi-processor device, according to an embodiment. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by multi-processor device 110, as shown in FIG. 1. In another embodiment, the method 300 is performed by CXL buffer device 210, as shown in FIG. 2, including primary processor 218 and secondary secure processor 220.

Referring to FIG. 3, at block 302, a secured message is optionally extracted from an encapsulation. For example, the message can be received at CXL buffer device 210 in a number of ways. If received by CXL interface controller 214 over CXL link 206 (e.g., using the CXL.io protocol) or by external interface controller 230 over side-band link 228, the secured message may be included within an MCTP encapsulation. Accordingly, primary processor 218 can extract the secured message, which can include a secured SPDM message, from any encapsulation. Alternatively, the message could be received via the Data Object Exchange (DOE) model over the CXL link 206, which may not utilize MCTP encapsulation.

At block 304, primary processor 218 requests decryption of the message. In one embodiment, the entire received message is encrypted using SPDM. In another embodiment, only a portion of the message is encrypted, such that there is an encrypted portion of the message and an unencrypted portion. Primary processor 218 can issue the request, such as by using a defined API call, to the secondary secure processor 220 to decrypt either the entire encrypted message or the encrypted portion of the message. In this manner, the decryption operations are offloaded to secondary secure processor 220 to keep the encrypted portion of the message secured (i.e., unknown to the primary processor 218) and to free the primary processor 218 to perform other operations.

At block 306, the secondary secure processor 220 decrypts the message on behalf of the primary processor 218. In one embodiment, the secondary secure processor 220 utilizes an SPDM session key to decrypt the encrypted portion of the message. The SPDM session key can be derived during the Diffie-Hellman key exchange performed when the secured SPDM session was originally established over the CXL link 206.

At block 308, the secondary secure processor 220 analyzes the decrypted portion of the message to determine whether the decrypted portion includes information pertaining to sensitive data. For example, the secondary secure processor 220 can analyze the decrypted portion of the message to determine whether the decrypted portion comprises information pertaining to a link encryption key (e.g., an IDE key) associated with data transfer between host system 202 and memory module 204 over CXL link 206. In one embodiment, the secondary secure processor 220 can check to see if the decoded portion is a vendor defined message, and if so, examine a header in the decoded portion to see if the portion includes a specific type of command (e.g., an encryption key program request or an encryption key creation request). In one embodiment, an encryption key program request can be a KEY_PROG message, and an encryption key creation request can be a GET_KEY message.

If the specific type of command pertaining to a link encryption key is not present (i.e., there is no sensitive data), at block 310, the secondary secure processor 220 can return the decoded portion of the message to the primary processor 218 for further processing. At block 312, the primary processor 218 can process the decrypted message, and at block 314, the primary processor 218 can generate a response message. At block 316, the secondary secure processor 220 can encrypted the response message (e.g., using the SPDM session key), and at block 318, the primary processor 318 optionally encapsulates the response message (e.g., into an MCTP encapsulation) before the response message is sent back to the host system 202 (e.g., by CXL interface controller 214 over CXL link 206 or by external interface controller 230 over side-band link 228).

If, at block 308, the secondary secure processor 220 determines that the specific type of command pertaining to a link encryption key is present in the message, the secondary secure processor 220 can perform further processing depending on the type of command. For example, if the secondary secure processor 220 determines that the decrypted message includes a link encryption key program request, at block 320, the secondary secure processor 220 can extract a link encryption key from the request and provide the link encryption key to the CXL interface controller 214 via the secure private bus 224. At operation 322, the secondary secure processor 220 can optionally replace the link encryption key with dummy data in the link encryption key program request. In one embodiment, the dummy data can include a default data pattern (e.g., all 0's, all 1's, or some other detectable pattern) that is inserted into the message at a location where the link encryption key was originally located. When provided to the primary processor 218, the primary processor 218 can recognize the dummy data to confirm that the secondary secure processor 220 successfully extracted and stored the link encryption key. In another embodiment, the secondary secure processor 220 does not replace the link encryption key with dummy data, but rather leaves the link encryption key out of the message all together. At operation 310, the secondary secure processor 220 can return the link encryption key program request with the dummy data (or at least without the link encryption key) to the primary processor 218.

If instead, the secondary secure processor 220 determines that the decrypted message includes a link encryption key creation request, at block 324, the secondary secure processor 220 generates a link encryption key and provides the link encryption key to the interface controller via the secure private bus 224. Depending on the embodiment, the secondary secure processor 220 can generate the link encryption key in one of a number of different ways. For example, secondary secure processor 220 can utilize a hardware key derivation function (KDF) that uses a base key stored in non-volatile memory of the root of trust, along with metadata, to derive the link encryption key. In this case, the root of trust's CPU neither "sees" the base key nor the derived key, as the hardware KDF delivers the derived key directly to interface 224. In another embodiment, the secondary secure processor 220 can use a software-based key derivation function. This Implementation would use a base key from the root of trust's non-volatime memory that is visible to the root of trust's CPU. Like the hardware KDF, the software KDF would mix the base key with metadata to derive the key and the root of trust's software would then export the key via interface 224 to the CXL interface controller 214. The metadata used for either the hardware KDF or the software KDF could come from information in the received message. In yet another embodiment, the secondary secure processor 220 could use a true random number generator (TRNG) to generate the key. The sampled key is then exported by software via interface 224 to the CXL interface controller 214.

At block 326, the secondary secure processor 220 generates a response message corresponding to the received message and containing the locally generated link encryption key, and, at block 316, encrypts the response message and provides the response message to the primary processor 218.

Figure 4:
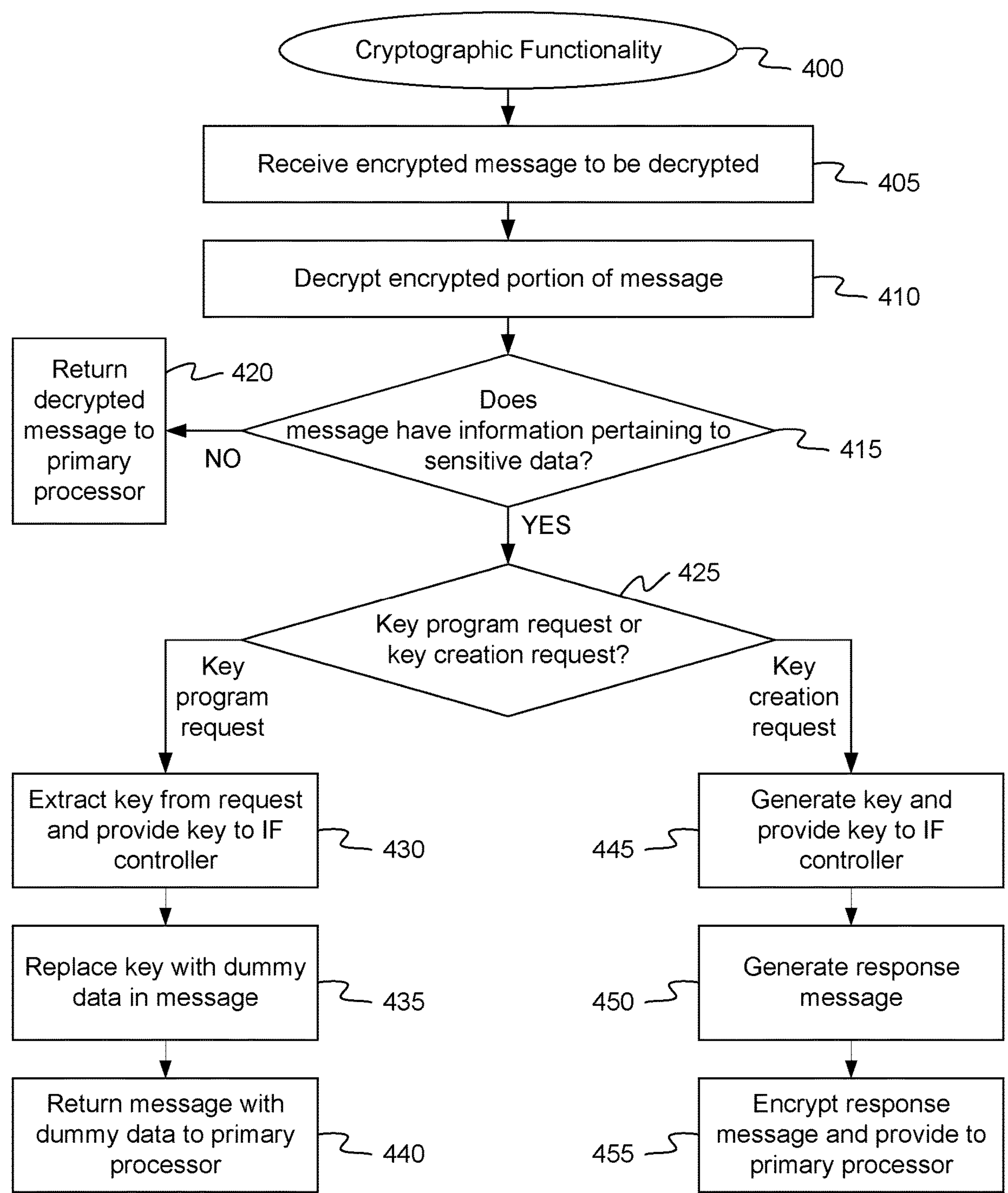
FIG. 4 is a flow diagram illustrating a method of cryptographic functionality of a secondary secure processor in a multi-processor device, according to an embodiment.

FIG. 4 is a flow diagram illustrating a method of cryptographic functionality of a secondary secure processor in a multi-processor device, according to an embodiment. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by secondary secure processor 120, as shown in FIG. 1. In another embodiment, the method 400 is performed by secondary secure processor 220, as shown in FIG. 2.

Referring to FIG. 4, at block 405, an encrypted message is received from a primary processor, such as primary processor 218. In one embodiment, the secondary secure processor 220 receives an internal API call from the primary processor 218 including a request to decrypt at least a portion of a received SPDM message.

At block 410, the secondary secure processor 220 decrypts the message on behalf of the primary processor 218. In one embodiment, the secondary secure processor 220 utilizes an SPDM session key to decrypt the encrypted portion of the message. The SPDM session key can be derived during the Diffie-Hellman key exchange performed when the secured SPDM session was originally established over the CXL link 206.

At block 415, the secondary secure processor 220 analyzes the decrypted portion of the message and determine whether the decrypted portion includes information pertaining to sensitive data. For example, the secondary secure processor 220 can analyze the decrypted portion of the message to determine whether the decrypted portion comprises information pertaining to a link encryption key (e.g., an IDE key) associated with data transfer between host system 202 and memory module 204 over CXL link 206. In one embodiment, the secondary secure processor 220 can check to see if the decoded portion is a vendor defined message, and if so, examine a header in the decoded portion to see if the portion includes a specific type of command (e.g., an encryption key program request or an encryption key creation request). In one embodiment, an encryption key program request can be a KEY_PROG message, and an encryption key creation request can be a GET_KEY message.

If the secondary secure processor 220 determines that the message does not have information pertaining to sensitive data, at block 420, the secondary secure processor 220 can return the decoded portion of the message to the primary processor 218 for further processing.

If the secondary secure processor 220 determines that the message does have information pertaining to sensitive data, however, the secondary secure processor 220 can perform further processing depending on the type of command. At block 425, the secondary secure processor can determine whether the information pertaining to sensitive information includes a link encryption key program request or a link encryption key creation request.

If the secondary secure processor 220 determines that the decrypted message includes a link encryption key program request, at block 430, the secondary secure processor 220 can extract a link encryption key from the request and provide the link encryption key to the CXL interface controller 214 via the secure private bus 224. At operation 435, the secondary secure processor 220 can optionally replace the link encryption key with dummy data in the link encryption key program request. In one embodiment, the dummy data can include a default data pattern (e.g., all 0's, all 1's, or some other detectable pattern) that is inserted into the message at a location where the link encryption key was originally located. When provided to the primary processor 218, the primary processor 218 can recognize the dummy data to confirm that the secondary secure processor 220 successfully extracted and stored the link encryption key. In another embodiment, the secondary secure processor 220 does not replace the link encryption key with dummy data, but rather leaves the link encryption key out of the message all together. At operation 440, the secondary secure processor 220 can return the link encryption key program request with the dummy data (or at least without the link encryption key) to the primary processor 218.

If instead, the secondary secure processor 220 determines that the decrypted message includes a link encryption key creation request, at block 445, the secondary secure processor 220 generates a link encryption key and provides the link encryption key to the interface controller via the secure private bus 224. At block 450, the secondary secure processor 220 generates a response message corresponding to the received message, where the response message includes the generated link encryption key and, at block 455, encrypts the response message (e.g., using the SPDM session key) and provides the response message to the primary processor 218.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

What is claimed is:

1. An integrated circuit comprising:

an interface controller to receive a message, wherein at least a portion of the message is encrypted;

a primary processor coupled to the interface controller by a shared bus and configured to process the received message; and a secondary secure processor coupled to the primary processor by the shared bus and coupled to the interface controller by the shared bus and by a secure private bus separate from the shared bus and not accessible by the primary processor, wherein the secondary secure processor is configured to:

receive the message from the primary processor via the shared bus;

decrypt the portion of the message that is encrypted on behalf of the primary processor;

analyze the decrypted portion of the message to determine whether the decrypted portion comprises information pertaining to sensitive data;

return any non-sensitive decrypted portion of the message to the primary processor via the shared bus; and responsive to determining that the decrypted portion comprises information pertaining to sensitive data, process the information pertaining to the sensitive data and provide the sensitive data to the interface controller via the secure private bus not accessible by the primary processor while bypassing the primary processor.

2. The integrated circuit of claim 1, wherein the information pertaining to sensitive data comprises information pertaining to a link encryption key associated with data transfer between the integrated circuit and a host system.

3. The integrated circuit of claim 2, wherein the information pertaining to the link encryption key comprises a link encryption key program request, and wherein to process the link encryption key program request, the secondary secure processor is to:

extract a link encryption key from the request and provide the link encryption key to the interface controller via the secure private bus;

replace the link encryption key with dummy data in the link encryption key program request; and return the link encryption key program request with the dummy data to the primary processor.

4. The integrated circuit of claim 2, wherein the information pertaining to the link encryption key comprises a link encryption key creation request, and wherein to process the link encryption key creation request, the secondary secure processor is to:

generate a link encryption key and provide the link encryption key to the interface controller via the secure private bus;

generate a response message corresponding to the received message, the response message comprising the generated link encryption key; and encrypt the response message and provide the response message to the primary processor.

5. The integrated circuit of claim 2, wherein the secondary secure processor is further configured to:

responsive to determining that the decrypted portion does not comprise information pertaining to sensitive data, return the decrypted portion to the primary processor.

6. The integrated circuit of claim 1, wherein the secondary secure processor comprises a hardware root-of-trust processor.

7. The integrated circuit of claim 1, wherein the integrated circuit comprises a compute express link (CXL) buffer device.

8. A memory module comprising:

one or more memory devices; and a multi-processor device coupled to the one or more memory devices, the multi-processor device comprising:

an interface controller to receive a message from a host system, wherein at least a portion of the message is encrypted;

a primary processor coupled to the interface controller by a shared bus and configured to process the received message; and a secondary secure processor coupled to the primary processor by the shared bus and coupled to the interface controller by the shared bus and by a secure private bus separate from the shared bus and not accessible by the primary processor, wherein the secondary secure processor is configured to:

receive the message from the primary processor via the shared bus;

decrypt the portion of the message that is encrypted on behalf of the primary processor;

analyze the decrypted portion of the message to determine whether the decrypted portion comprises information pertaining to sensitive data;

return any non-sensitive decrypted portion of the message to the primary processor via the shared bus; and responsive to determining that the decrypted portion comprises information pertaining to sensitive data, process the information pertaining to the sensitive data and provide the sensitive data to the interface controller via the secure private bus not accessible by the primary processor while bypassing the primary processor.

9. The memory module of claim 8, wherein the information pertaining to sensitive data comprises information pertaining to a link encryption key associated with data transfer between the memory module and the host system.

10. The memory module of claim 9, wherein the information pertaining to the link encryption key comprises a link encryption key program request, and wherein to process the link encryption key program request, the secondary secure processor is to:

extract a link encryption key from the request and provide the link encryption key to the interface controller via the secure private bus;

replace the link encryption key with dummy data in the link encryption key program request; and return the link encryption key program request with the dummy data to the primary processor.

11. The memory module of claim 9, wherein the information pertaining to the link encryption key comprises a link encryption key creation request, and wherein to process the link encryption key creation request, the secondary secure processor is to:

generate a link encryption key and provide the link encryption key to the interface controller via the secure private bus;

generate a response message corresponding to the message received from the host system, the response message comprising the generated link encryption key; and encrypt the response message and provide the response message to the primary processor.

12. The memory module of claim 9, wherein the secondary secure processor is further configured to:

responsive to determining that the decrypted portion does not comprise information pertaining to sensitive data, return the decrypted portion to the primary processor.

13. The memory module of claim 8, wherein the secondary secure processor comprises a hardware root-of-trust processor.

14. The memory module of claim 8, wherein the multi-processor device comprises a compute express link (CXL) buffer device.

15. A method of operation of a multi-processor device in a memory module, the method comprising:

receiving, by a secondary secure processor in the multi-processor device, a message from a primary processor in the multi-processor device via a shared bus, wherein at least a portion of the message is encrypted;

decrypting, by the secondary secure processor in the multi-processor device, the portion of the message that is encrypted on behalf of the primary processor;

analyzing, by the secondary secure processor, the decrypted portion of the message to determine whether the decrypted portion comprises information pertaining to sensitive data;

returning, by the secondary secure processor in the multi-processor device, any non-sensitive decrypted portions of the message to the primary processor via the shared bus; and responsive to determining that the decrypted portion comprises information pertaining to sensitive data, processing, by the secondary secure processor, the information pertaining to the sensitive data and providing the sensitive data to an interface controller in the multi-processor device via a secure private bus separate from the shared bus and not accessible by the primary processor while bypassing the primary processor.

16. The method of claim 15, wherein the information pertaining to sensitive data comprises information pertaining to a link encryption key associated with data transfer between the memory module and a host system.

17. The method of claim 16, wherein the information pertaining to the link encryption key comprises a link encryption key program request, and wherein processing the link encryption key program request comprises:

extracting a link encryption key from the request and providing the link encryption key to the interface controller via the secure private bus;

replacing the link encryption key with dummy data in the link encryption key program request; and returning the link encryption key program request with the dummy data to the primary processor.

18. The method of claim 16, wherein the information pertaining to the link encryption key comprises a link encryption key creation request, and wherein processing the link encryption key creation request comprises:

generating a link encryption key and providing the link encryption key to the interface controller via the secure private bus;

generating a response message corresponding to the received message, the response message comprising the generated link encryption key; and encrypting the response message and providing the response message to the primary processor.

19. The method of claim 16, further comprising:

responsive to determining that the decrypted portion does not comprise information pertaining to sensitive data, returning, by the secondary secure processor, the decrypted portion to the primary processor.

20. The method of claim 15, wherein the secondary secure processor comprises a hardware root-of-trust processor, and wherein the multi-processor device comprises a compute express link (CXL) buffer device.

* * * * *